US012277153B2

United States Patent
Yoshida

(10) Patent No.: US 12,277,153 B2
(45) Date of Patent: Apr. 15, 2025

(54) STOP WORD DETECTION FOR QA CORPUS

(71) Applicant: International Business Machines Corporation, Armonk, NY (US)

(72) Inventor: Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 17/457,479

(22) Filed: Dec. 3, 2021

(65) Prior Publication Data

US 2023/0177075 A1 Jun. 8, 2023

(51) Int. Cl.
*G06F 16/3332* (2025.01)
*G06F 16/31* (2019.01)
*G06F 16/3329* (2025.01)

(52) U.S. Cl.
CPC ........ *G06F 16/3335* (2019.01); *G06F 16/322* (2019.01); *G06F 16/3329* (2019.01)

(58) Field of Classification Search
CPC . G06F 16/3335; G06F 16/322; G06F 16/3329
See application file for complete search history.

(56) References Cited

U.S. PATENT DOCUMENTS

| | | | | |
|---|---|---|---|---|
| 9,471,559 B2 * | 10/2016 | Castelli | ................ | G06F 16/353 |
| 10,019,492 B2 | 7/2018 | Zhou | | |
| 10,380,177 B2 | 8/2019 | Kabeya | | |
| 10,452,694 B2 | 10/2019 | Lu | | |
| 12,086,721 B1 * | 9/2024 | Smith | ...................... | G06N 3/09 |
| 2002/0147578 A1 * | 10/2002 | O'Neil | ................ | G06F 16/3322 |
| | | | | 707/E17.071 |
| 2011/0004610 A1 | 1/2011 | Rose | | |
| 2017/0046625 A1 * | 2/2017 | Takaai | ................ | G06F 16/3329 |
| 2017/0169344 A1 * | 6/2017 | Mangharam | ........... | G06N 5/025 |
| 2020/0242305 A1 * | 7/2020 | Wu | .......................... | G06N 5/02 |
| 2020/0312297 A1 * | 10/2020 | Chatterjee | ............. | G06F 40/169 |
| 2020/0356604 A1 * | 11/2020 | Macdougall | ........... | G06N 20/00 |
| 2021/0056266 A1 * | 2/2021 | Ma | ........................ | G06F 16/353 |
| 2021/0117456 A1 * | 4/2021 | Katz | ................... | G06F 16/3329 |

(Continued)

FOREIGN PATENT DOCUMENTS

CN 110175585 A * 8/2019
CN 110413636 A * 11/2019

OTHER PUBLICATIONS

Hakimov et al., "Semantic Question Answering System over Linked Data using Relational Patterns," Proceedings of the Joint EDBT/ICDT 2013 Workshops (EDBT/ICDT '13), Mar. 18-22, 2013, 6 pages. <https://www.researchgate.net/publication/262391126>.

(Continued)

*Primary Examiner* — Richa Sonifrank
*Assistant Examiner* — Alvin Iskender
(74) *Attorney, Agent, or Firm* — Stosch Sabo

(57) ABSTRACT

Dependency trees are generated for questions and answers of a question answering (QA) corpus in which the answers are associated with the questions. Generating the dependency trees includes identifying root nodes. A word near an identified root node of one of the questions is compared to words of answers associated with the one of the questions. The word is determined to be in less than a threshold number of the associated answers. The word is identified as a stop word.

13 Claims, 3 Drawing Sheets

(56) References Cited

U.S. PATENT DOCUMENTS

2021/0303798 A1* 9/2021 Duong .................... H04L 51/02
2023/0205794 A1* 6/2023 Smaagard ............. G06F 16/322
　　　　　　　　　　　　　　　　　　　　　707/765

OTHER PUBLICATIONS

Nagano et al., "Real-time contact center operator support using voice recognition system," The IEICE Transactions on Information and Systems (Japanese Edition), vol. J102-D, No. 9, Sep. 2019, pp. 597-608.

Sakata et al., "FAQ Retrieval using Query-Question Similarity and BERT-Based Query-Answer Relevance," SIGIR 19, Jul. 21-25, 2019, 4 pages.

* cited by examiner

STOP WORD DETECTION FOR QA CORPUS

BACKGROUND

Computers are increasingly being used for natural language processing (NLP) of natural language text generated by humans. For example, computers are being used to identify the meaning of natural language data by contextualizing the meanings and interrelations between the individual words within the natural language data. This includes training computers to understand how words are interrelated, such as identifying "stop words" within natural language data. Stop words includes words that are filtered out of the natural language data prior to some steps of analysis, as the exclusion of the stop words is determined to improve conclusions/correlations that can be drawn from the natural language data. Stop words tend to be extremely domain specific, as a word that is unhelpful for one domain may be required for another domain.

SUMMARY

Aspects of the present disclosure relate to a method, system, and computer program product relating to identifying stop words for a question answering (QA) system. For example, the method includes generating dependency trees for questions and answers of a QA corpus in which the answers are associated with the questions. Generating the dependency trees includes identifying root nodes. The method also includes comparing a word near an identified root node of one of the questions to words of answers associated with the one of the questions. The method also includes determining that the word is in less than a threshold number of the associated answers. The method also includes identifying the word as a stop word. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
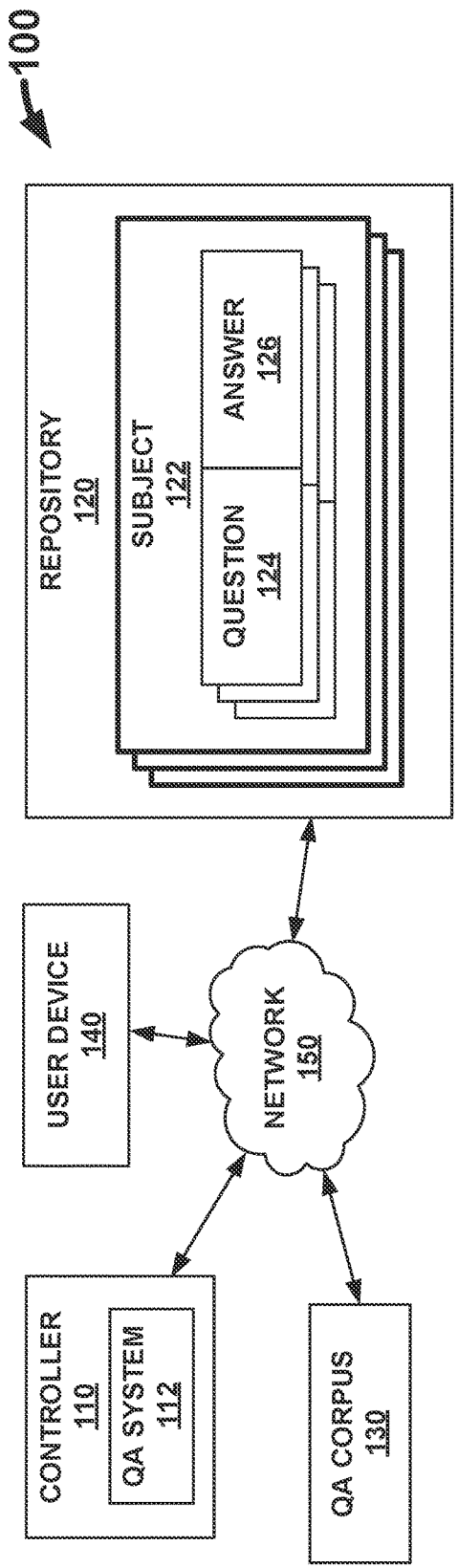
FIG. 1A depicts a conceptual diagram of an example system in which a controller may identify stop words of a QA system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying a stop word for a question answering (QA) system, while more particular aspects of the present disclosure relate to identifying the stop word by determining that the stop word was near the root node of a question but was not in a threshold number of answers related to the question. While the present disclosure is not necessarily limited to such applications, various aspects of the disclosure may be appreciated through a discussion of various examples using this context.

A conventional QA system (which might otherwise be referred to as a frequently asked question (FAQ) system) may utilize data structured as sets of questions and corresponding answers. Both the questions and the answers may be stored in a natural language format. For example, the question may include "where can I find a contact email address for lost and found" where the answer is "please visit our lost and found page at www.xyzcorp.com/lostandfound." In some examples, a question and answer set may be stored in a "document" that contains this natural language text. Question and answer sets may be stored in a QA corpus. Conventional QA systems may be used to, e.g., support website functionality that provides answers to users (e.g., via a chatbot or the like), and/or to support internal support of customers.

QA systems may be evaluated based on their ability to provide an answer that is correct and/or a user finds satisfactory, where this ability is defined as the "accuracy" of the QA system. Conventional systems utilize a number of information retrieval and deep learning techniques to try to improve accuracy. For example, the conventional systems may convert a user query into a set of keywords using natural language processing (NLP) techniques, where these keywords are then used as features of a query. The conventional system may then compare each question and answer set from the QA compares against these features of the query to attempt to identify the best answer.

However, a problem with conventional systems is that some keywords are irrelevant to the actual intent of the query. Beyond this, some keywords may be actively harmful to the accuracy of a search, such that identifying such a keyword as a feature of a query to be compared to QA sets of the QA corpus may reduce an accuracy of the QA system. For example, the words "can" and "find" from the question "where can I find a contact email address for lost-and-found?" may be harmful because these words do not indicate any concrete meaning of the question. Using these keywords as features of the a query for the QA corpus may return incorrect or otherwise suboptimal QA sets that contain these words as many other QA sets may also contain other derivations of the expression "where can I find . . . " that also contain one or both of "where" and "can".

A conventional system attempts to avoid this situation by having a skilled analyst (e.g., such as a data scientist) manually define a list of such keywords that are thought to be incorrect or otherwise suboptimal. Once defined, the analyst will feed these keywords to the QA systems as stop words. This process may be both labor intensive and also error-prone, as keywords may vary depending upon domain and subject, and different combinations of keywords may notably change the search.

Aspects of this disclosure may solve or otherwise address these technical problems of conventional QA systems by automating this previously manual process. Specifically, aspects of this disclosure are related to identifying words near a root node of questions are not sufficiently present within answers as stop words. For example, aspects of this disclosure may generate dependency trees of questions and answers, and may identify words as being stop words when they are present near root nodes of questions but not present near root nodes of answers. A computing device that includes a processing unit executing instructions stored on a memory may provide this functionality, this computing device herein referred to as a controller. As explained herein, stop words are likely found at or near the root node of a question in a dependency tree, though taken alone many root node words are still meaningful (and should therefore not be marked as stop words). However, as discussed herein, when words at or near a root node do not appear in answers in a corresponding fashion, aspects of this disclosure may quickly and accurate identify these words as stop words. By using NLP techniques to accurately identify stop words without requiring manual selection, aspects of the disclosure may improve a technical ability (an ability to identify unknown stop words) that is lacking in conventional systems.

For example, FIG. 1A depicts environment 100 in which controller 110 identifies stop words for QA system 112. QA system 112 may be configured to facilitate identifying answers to questions received from users via user devices 140. QA system 112 may autonomously provide these answers, and/or QA system may be a tool with which human personnel determine answers to these questions. As depicted, the logic of QA system 112 may be a subcomponent of controller 110, though in other examples the inverse may be true (e.g., where controller 110 is a component within QA system 112), and/or in certain examples controller 110 and QA system 112 may be part of separate physical devices that do not overlap (e.g., such that minimal or no processing or memory resources are shared between controller 110 and QA system 112).

Figure 2:
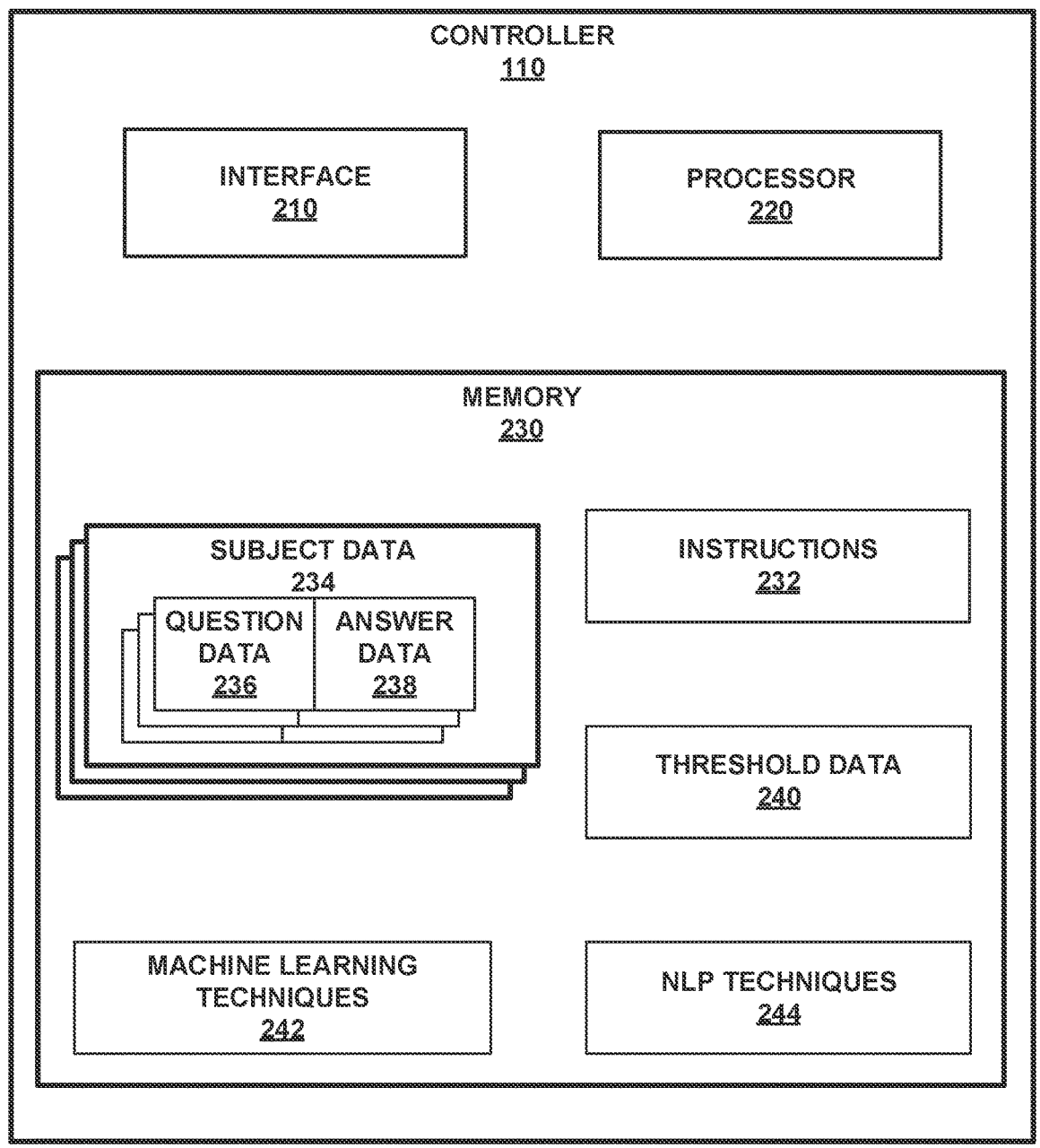
FIG. 2 depicts a conceptual box diagram of example components of the controller of FIG. 1A.

Controller 110 may include a computing device, such as computing system 200 of FIG. 2 that includes a processor communicatively coupled to a memory that includes instructions that, when executed by the processor, causes controller 110 to execute one or more operations described below. As discussed above, QA system 112 may be incorporated into (or be functionality of) this computing device. QA system 112 may provide these answers using QA corpus 130, which may include structured natural language text of questions and answers. Structured text, as discussed herein, may include text for which syntactical, linguistic, and/or thematic relationships are known for some or all words of the text, such that this NLP metadata about the natural language text is tagged in a searchable format.

Some or all of the structured text of QA corpus 130 may previously have been unstructured texts as found within repository 120. Repository 120 may include a historical database in which questions 124 and answer 126 have been paired together (e.g., where a question is paired with an answer that has been determined to be satisfactory to that question) within a given subject 122. For example, repository 120 may include a FAQ database such as a series of FAQ webpages maintained by an organization associated with controller 110. Additionally, and/or alternatively, repository 120 may include historical text exchanges between a user with a question and a subject matter expert providing an answer that the user is satisfied with. For example, repository 120 may include saved text exchanges communicated over a texting application in which an inquiring user asked questions and a helping user provided answers. Though in FIG. 1A only one repository 120 is depicted, in some examples there may be numerous repositories 120, where controller 110 crawls through many or each of these repositories to identify questions 124 that are associated with answers 126 for given subjects 122.

Though only one answer 126 is depicted as being paired with each question 124 within FIG. 1A, in many cases there may be numerous questions 124 that are paired with some or each answer 126, such that there is a many-to-one relationship between questions 124 and answers 126 (e.g., many questions 124 to one answer 126). In other examples, there may be multiple answers 126 related to one question 124, where there may be numerous ways to respond sufficiently to questions 124. Additionally, in some examples there may be a many-to-many relationship between questions 124 and answers 126, where there are "dotted lines" (e.g., conditional relationships) that link various questions 124 that could be related to some answers 126 for some circumstances.

Controller 110 may receive questions 124 and answers 126 over network 150. Network 150 may include one or more computer communication networks. An example network 150 can include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, repository 120, QA corpus 130, and/or user device 140) may receive messages (e.g., such as messages that include unstructured texts 120) and/or instructions from and/or through network 150 and forward the messages and/or instructions for storage or execution or the like to a respective memory or processor of the respective computing/processing device. Though network 150 is depicted as a single entity in FIG. 1A for purposes of illustration, in other examples network 150 may include a plurality of private and/or public networks over which controller 110 may manage connectivity as described herein.

Figure 1B:
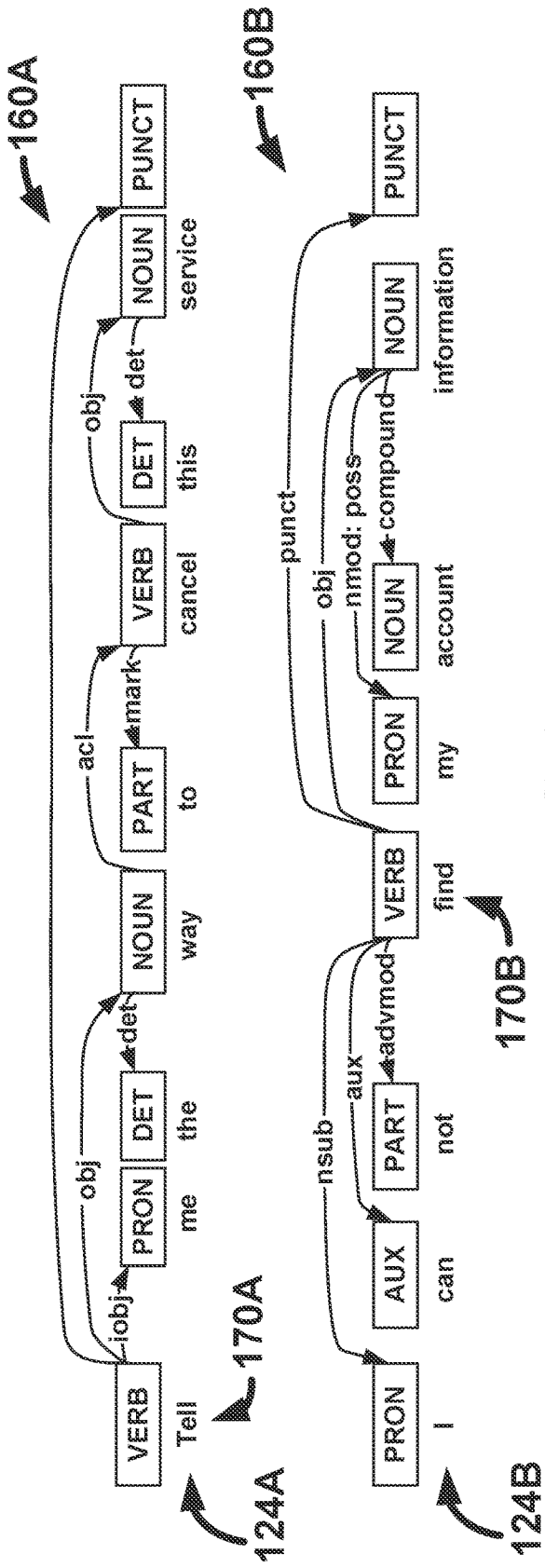
FIG. 1B depicts two example dependency trees of two example questions.

FIG. 1B depicts two example questions 124A, 124B, where question 124A is "Tell me the way to cancel this service." and question 124B is "I can not find my account information." As discussed herein, controller 110 may detect questions 124A, 124B as being historical questions 124 within repository 120. Alternatively, or additionally, controller 110 may have gathered questions 124A, 124B from other sources in other examples, such as directly from user devices 140. Controller 110 may structure questions 124A, 124B for use within QA corpus 130. For example, controller 110 may generate respective dependency trees 170A, 170B (collectively, "dependency trees 170") as depicted within FIG. 1B for respective questions 124A, 124B. The provided dependency trees 170 should be understood to be non-limiting examples as to what a dependency tree can look like, as one of ordinary skill in the art would understand numerous other dependency tree structures that are consistent with this disclosure.

Controller 110 may generate dependency trees 170 such that they define root nodes 170A, 170B (collectively, "root nodes 170"). Root nodes 170 may be understood to be a word or linguistic entity that is at a top "level" of a respective sentence 124, such that there is no other word upon which root nodes 170 linguistically "depend." Though in the provided examples there are a single root node 170 in each sentence, aspects of this disclosure may relate to examples where there are numerous root nodes 170 in some sentences 124 (e.g., in examples where someone is departing from the standard use within the NLP community in which the consensus is that there is a single rot node for a dependency tree).

Controller 110 may identify the words (e.g., where words, as used herein, are understood to include defined words, symbols, punctuation, or other such linguistic entities that convey meaning within sentences 124) that are at root nodes 170. For example, controller 110 may determine that word "tell" is at root node 170A of sentence 124A, while word "find" is at root node 170B of sentence 124B. Controller 110 may also identify all words that are near root nodes 170, where near includes words at descendant nodes that are within a certain "depth" of root nodes 170. As used herein, a descendant node is a node that depends upon root nodes 170, where descendant nodes may depend directly upon root nodes 170 (e.g., such that these descendant nodes define a depth of one) or may depend through other descendant nodes (where the number of interceding descendant nodes defines the depth). For example, controller 110 may identify that words at descendant nodes within a depth of "one" of root node 170A are "me," "way," and the punctuation (".") that ends sentence 124A. For another example, controller 110 may identify that words at descendant nodes within a depth of "two" of root node 170A include additional words "the" and "cancel," that words within a depth of "three" include additional words "to" and "service," etc.

Once controller 110 identifies words that are at and/or near root nodes 170 of questions 124, controller 110 may determine whether or not these words are within answers 126 associated with these questions 124. For example, controller 110 may determine whether or not these words are within answers 126 near root nodes 170 of these answers 126 (e.g., in a manner analogous to how words are near root nodes 170 of questions 124). Where controller 110 determines that a word that is near root nodes 170 of questions 124 is appropriately present in corresponding answers 126 less than a threshold amount, controller identifies this word as a stop word. The threshold amount may be one, such that controller 110 only identifies a word as a stop word responsive to that word being near the root node 170 of questions 124 when that word is not found (e.g., is not found near root nodes 170) within answers 126 associated with the question 124. In other examples, the threshold amount may include a number greater than one (e.g., two, three, four, five, etc.).

Controller 110 may be configured to determine that a word is near root nodes 170 only when a word is in the root node 170. Alternatively, controller 110 may be configured to determine that a word is near root nodes 170 when a word is at the root node and/or at descendant nodes that are within a predetermined depth of root nodes 170 (e.g., within a depth of one, or within a depth of two, etc.).

In some examples, controller 110 may determine whether a word is near root nodes 170 and/or what the threshold amount (of times that a word has to be in answers to avoid being categorized as a stop word) is based on subject 122 of questions 124 and answers 126. For example, controller 110 may be configured to identify stop words for a plurality of subjects 122, where different subjects 122 have different threshold amounts and/or threshold depths that stop words may occur at. This may include a situation where for a first subject 122 controller 110 only identifies words as stop words in response to these words being at root nodes 170 and not being in any answers 126, where for a second subject controller 110 identifies words as stop words in response to these words being either at root nodes 170 or at descendants with a depth of one and being in two or less answers 126. In other examples, controller 110 may have a static threshold amount and a static understanding of what it means to be near root nodes 170, such that controller 110 uses these static rules for all subjects 122.

In this way, controller 110 may structure question 124 answer 126 sets of repository 120 into QA corpus 130. For example, repository 120 may include QA sets $S=\{s_1, s_2, \ldots, s_n\}$, where $s_i=(Q_i, A_i)$ in which $Q_i$ is a natural language sentence question and $A_i$ is a natural language sentence answer. Controller 110 may apply dependency parsing to questions 124 $Q_i$ and answers 126 $A_i$ (where i=1, . . . , n) in order to generate dependency trees 160 for all questions 124 and answers 126.

Once controller 110 generates dependency trees 160, controller 110 may classify the words in dependency trees 160 into four categories with occurrence frequencies $f_1(w)$, $f_2(w)$, $f_3(w)$, and $f_4(w)$ for each word w. As used herein, f1(w) is the frequency of each word w that appears as the root node or near the root node of a Q, f2(w) is the frequency of w that does not appear as the root node or near the root node of a Q, f3(w) is the frequency of w that appears as the root node or near the root node of an A, and f4(w) is the frequency of w that does not appear as the root node or near the root node of an A.

Controller 110 may further define being near a root node as any of a set of descendant nodes of depth <p for a given p. The first category (1) may include words at root nodes 170 or near root nodes 170 of questions 124, while the second category (2) includes words not at root nodes 170 or near root nodes of questions 124, while the third category (3) includes words in root nodes 170 or near root nodes 170 of answers 126, while the fourth category (4) includes words not in root nodes 170 or the near root nodes 170 of answers 126.

Controller 110 may then identify words that satisfy both:

$$\frac{f_1(w)}{f_2(w)} \geq \alpha$$

and one of $$f_3(w) + f_4(w) \leq \beta \cdot (f_1(w) + f_2(w))$$

or $$\frac{f_3(w)}{f_4(w)} \geq \gamma$$

Where $f_1(w)+f_2(w)$ is the total frequency in questions 124 in repository 120, and $\alpha$, $\beta$ and $\gamma$ are parameters that can be tuned to improve accuracy. In this way, as empirically shown below, controller 110 is able to cure a defect of conventional systems by autonomously detecting stop words for QA systems.

As described above, controller 110 may be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with repository 120, QA corpus 130, user device 140, or the like. Interface 210 may include one or more network interface cards, such as Ethernet cards and/or any other types of interface devices that can send and receive information. Various numbers of interfaces may be used to perform the described functions according to particular needs.

As discussed herein, controller 110 may be configured to identify stop words by determining that words near a root node of questions are not sufficiently present within answers to these questions. Controller 110 may utilize processor 220 to thusly identify stop words. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to identify stop words accordingly.

Processor 220 may identify stop words by analyzing words near root nodes of questions and answers according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may identify stop words as described herein according to instructions 232 of one or more applications (e.g., software applications) stored in memory 230 of controller 110.

In addition to instructions 232, in some examples gathered or predetermined data or techniques or the like as used by processor 220 to identify stop words as described herein may be stored within memory 230. For example, memory 230 may include information described above as stored within repository 120 and/or QA corpus 130. For example, as depicted in FIG. 2, memory 230 may include subject data 234, which itself includes question data 236 that is paired with answer data 238. Subject data 234 includes identifying information on a subject, such as a product line, a general type of query (e.g., a billing question, or a support question), or the like. Question data 236 may include the natural language text of questions 124, generated dependency trees 160, identified root nodes 170, or the like. Similarly, answer data 238 may include the natural language text of answers 126, generated dependency trees 160, identified root nodes 170, or the like.

Further, memory 230 may include threshold data 240. Threshold data 240 may include data that defines when a word of a question is a stop word. For example, threshold data 240 may include the threshold amount of times that a candidate word can be in answers 126 while still being a stop word, or threshold data 240 may include the locations within questions 124 and/or answers 126 at which the candidate stop word can to be found, or the like.

Memory 230 may further include machine learning techniques 242 that controller 110 may use to improve a process of identifying stop words as discussed herein over time. Machine learning techniques 242 can comprise algorithms or models that are generated by performing supervised, unsupervised, or semi-supervised training on a dataset, and subsequently applying the generated algorithm or model to identify stop words. For example, using machine learning techniques 242, controller 110 may update one or more thresholds saved in threshold data 240 to improve a process of identifying stop words. Specifically, using machine learning techniques 242, controller 110 may determine that for a first subject candidate words are stop words only when the candidate words are in root nodes of questions 124 but not found in the first three depths of any answers 126, and may set thresholds accordingly (e.g., a threshold amount of 1 answer that includes the candidate stop word within a depth of three of the answer 126 dependency tree 160 for candidate stop words that are found at the root node for questions 124). Alternatively, controller 110 may use machine learning techniques 242 to determine that for a second subject candidate words are stop words when they are within a depth of two of questions 124 and in no more than one answer at any depth, and may adjust threshold data 240 accordingly.

Machine learning techniques 242 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 242 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Memory 230 may further include NLP techniques 244. NLP techniques 244 can include, but are not limited to, semantic similarity, syntactic analysis, and ontological matching. For example, in some embodiments, processor 220 may be configured to analyze natural language text from questions 124 and answers 126 to determine semantic features (e.g., word meanings, repeated words, keywords, etc.) and/or syntactic features (e.g., word structure, location of semantic features in headings, title, etc.) of QA sets. Ontological matching could be used to map semantic and/or syntactic features to a particular concept. The concept can then be used to determine the respective subjects 122 of QA sets, to best structure this data. In this same way, controller 110 may identify subjects with which to group questions 124 and answers 126 together, and/or execute operations such as identifying a subject of an incoming question (e.g., a question incoming from user device 140) in order to determine what set of thresholds from threshold data 240 to apply in analyzing this incoming question (e.g., where thresholds are unique to different subjects 122).

Figure 3:
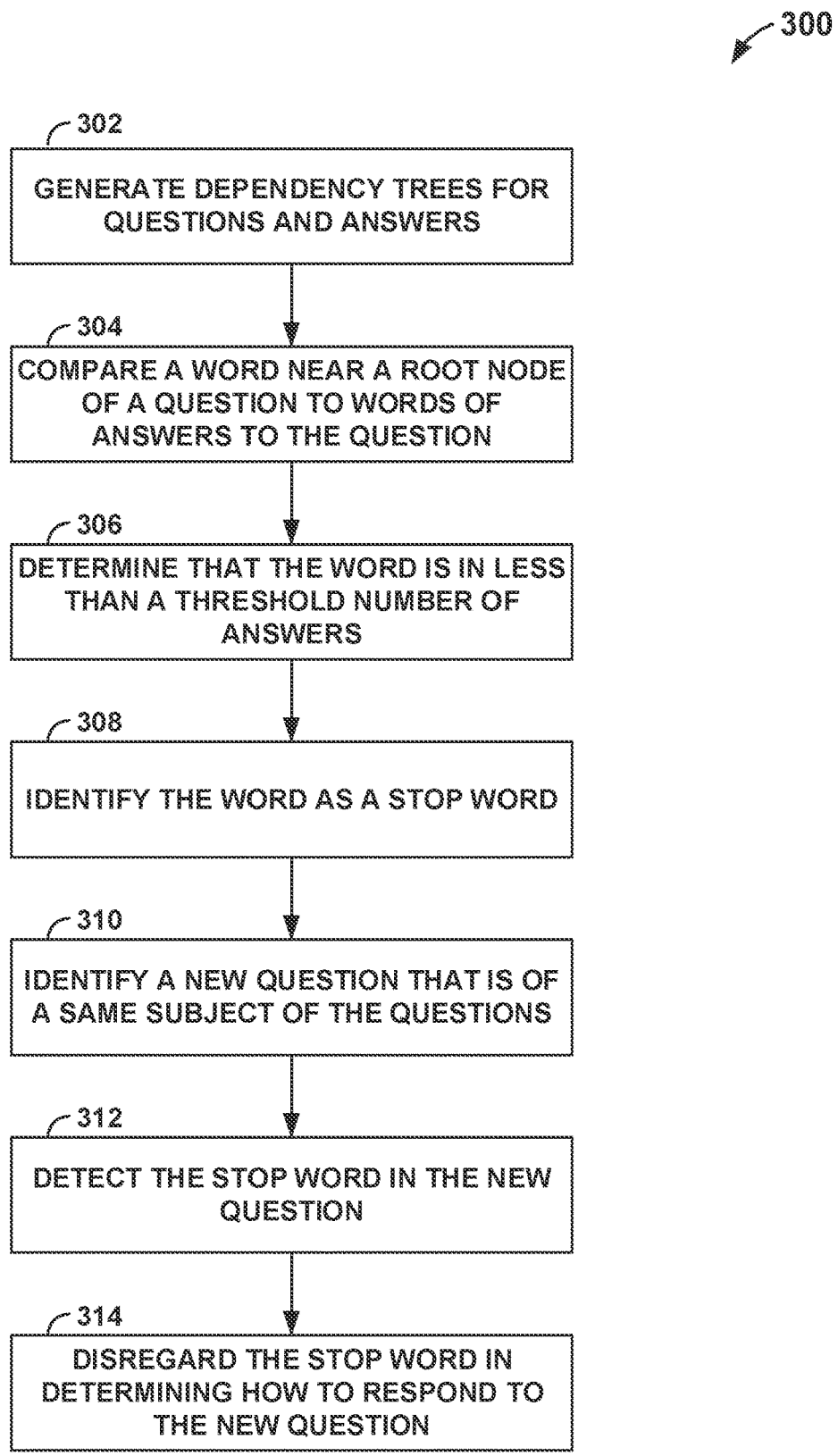
FIG. 3 depicts an example flowchart by which the controller of FIG. 1A may identify words as stop words within a QA system.

Using these components, controller 110 may identify stop words by comparing words near root nodes of questions and answers as discussed herein. For example, controller 110 may identify stop words according to flowchart 300 depicted in FIG. 3. Flowchart 300 of FIG. 3 is discussed with relation to FIG. 1A for purposes of illustration, though it is to be understood that other systems and message may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Flowchart 300 starts with controller 110 generating dependency trees 160 for questions 124 and answers 126 (302). Answers 126 are associated with questions 124. Controller 110 generates dependency trees 160 such that root nodes 170 of both questions 124 and answers 126 are identified.

In some examples, controller 110 generates dependency trees 160 for structured questions 124 and answers 126 after gathering these questions 124 and answers 126 from repository 120. For example, controller 110 may gather these questions 124 and answers 126 from repository 120 in which questions 124 and answers 126 are stored in an unstructured format. Specifically, questions 124 and answers 126 may be stored in such a way that questions 124 and answers 126 are not fit for "mining" for future QA operations. This may include questions 124 and/or answers 126 not being tagged with various part-of-speech tags, or not being tagged as relating to respective subjects 122 in a manner that would be detectable by QA system 112 executing a query. Accordingly, controller 110 may correlate data (e.g., NLP data) of the unstructured questions 124 with data of unstructured answers 126 to structure these questions 124 and answers 126, upon which controller 110 may compile these (now structured) questions 124 and answers 126 into QA corpus 130 such that questions 124 and answers 126 are in a mineable format.

Controller 110 compares a word near identified root nodes 170 of questions 124 to words of answers 126 associated with these questions 124 (304). In some examples, controller 110 may determine that a word is near identified root nodes 170 only if the word is at the respective root node 170, whereas in other examples controller 110 may determine that all descendant nodes within a predetermined depth are near the identified root nodes 170 as discussed herein.

In some examples, controller 110 may compare words near identified root nodes 170 of questions 124 to all words of answers 126. In other examples, controller 110 may only compare words near root nodes 170 of questions to words of answers 126 that are near root nodes 170 of answers 126. Controller 110 may determine which words controller 110 is to compare based on various thresholds, where these thresholds may change based on identified subjects 122, and/or these thresholds may change over time as dictated via machine learning (ML) as described herein.

Controller 110 determines that a word near a root node 170 of a respective question 124 is in less than a threshold number of the associated answers 126, and/or is not present in associated answers 126 in the appropriate manner (e.g., where the appropriate manner relates to being within a predetermined depth) (306). For example, this threshold number of answers 126 to include the candidate word may be zero, such that controller 110 determines that this word is in less than the threshold number of associated answers 126 in response to determining that the word is in zero associated answers 126. Alternatively, the threshold number may be more than one. In some examples, this threshold number may be associated with a depth at which the word is found. For example, the threshold may be one at the identified root node 170, two at a depth of one, and four at a depth of two (e.g., such that controller 110 may determine that the word is in less than the threshold number of associated answers 126 if the word is never present in root nodes 170, is present only once at a directly descendant node, and is present only twice at a descendant node with a depth of two. In response to determining that the word is in less than the threshold number of associated answers 126, controller 110 identifies the word as a stop word (308).

Following this, controller 110 identifies a new question that is of a same subject 122 as the previously analyzed questions 124 (310). For example, controller 110 may identify this question as sent via user device 140 to QA system 112 for answering. Controller 110 may identify the stop word as being within in this new question (312). Specifically, controller 110 may detect the stop word as being near a respective root node 170 of the new question as discussed herein. Controller 110 may therein cause QA system 112 to disregard the stop word within the new question in determining how to respond to this new question (314). In this way, controller 110 may identify stop words that are identified as being irrelevant to question-answering over time, increasing an accuracy of QA system 112 as stop words are identified and implemented.

Aspects of this disclosure have been tested and verified as statistically able to identify stop words. For example, aspects of this disclosure were evaluated using natural Japanese language FAQ question-answer sets and test queries, where the number of question-answer sets was 627 and the number of test queries was 1,242. This evaluation was done using the two conditions of:

$$\frac{f_1(w)}{f_2(w)} \geq \alpha \quad \text{(i)}$$

$$\left\{ f_3(w) + f_4(w) \leq \beta \cdot (f_1(w) + f_2(w)) \text{ or } \frac{f_3(w)}{f_4(w)} \geq \gamma \right\} \quad \text{(ii)}$$

as discussed above, where the evaluation used values of:

$$f_1(w) \geq 5, \alpha=2, \beta=0.8, \gamma=1$$

in which only root nodes were used in the process flow (i.e., p=0).

Further, within the evaluation 1ex (canonicalized forms) of noun, verb, adjective, and adverb were used. For example, "told" was evaluated as "tell," and "smaller" was evaluated as "small." The evaluation was compared as a baseline (i.e., no stop words), using general frequency (i.e., in which any word w for $f_1(w) \geq 10$ is identified as a stop word), and also compared using the proposed methods and formulas provided above.

The evaluation used Precision@K (hereinafter referred to as "P@k") as the evaluation metric. P@k=y holds that for each of y % of the test queries the correct answer can be found in the top-k of the search result, where larger values are better.

Aspects of the disclosure were demonstrated to find a sound list of stop words that improves P@1 and P@3 with comparable P@k for k=5, 10, 20. Comparatively, a naïve approach of using frequent words was found to not produce accurate stop words. The naïve approach similarly was found to not work for other thresholds values like 20 and 5.

In this way, the evaluation showed that the proposed method using condition (i) found a strong list of candidate stop words, where condition (ii) was effective at eliminating "false positive" candidate stop words that did not yield good results, therein empirically demonstrating the ability of aspects of the disclosure to accurately identify stop words. The evaluation indicated that using only condition (ii) may in certain circumstances be prone to suboptimal sets of stop words, as a value of γ that is too small may give too many candidates while meaningful words remain in the list if the value of γ is too large.

Evaluation Results

| Method | P@1 | P@3 | P@5 | P@10 | P@20 |
| --- | --- | --- | --- | --- | --- |
| Baseline | 30.3 | 54.6 | 68.2 | 83.1 | 92.1 |
| Freq | 29.8 | 53.7 | 67.1 | 81.3 | 91.5 |
| Proposed (i) | 29.9 | 53.7 | 66.6 | 81.7 | 91.7 |
| Proposed (i + ii) | 31.9 | 55.2 | 68.2 | 83.1 | 92.1 |

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    training, by a controller associated with a Question Answering (QA) system, a machine learning model on a dataset, wherein the machine learning model is configured to output a predetermined depth and a threshold number of associated answers for identifying stop words;
    iteratively updating, by the controller and using the machine learning model, the predetermined depth and the threshold number of associated answers for identifying the stop words:
    generating, by the controller, dependency trees using Natural Language Processing (NLP techniques for questions and answers of a question answering (QA) corpus in which the answers are associated with the questions, wherein generating the dependency trees includes identifying root nodes;
    comparing, by the controller, a word near an identified root node of one of the questions to words of answers associated with the one of the questions by comparing words of descendant nodes of the identified root node of one of the questions up to the predetermined depth to corresponding words of descendent nodes of respective root nodes of the associated answers up to the predetermined depth;
    determining, by the controller, that the word is in less than the threshold number of the associated answers by determining that the words of the descendent nodes of the identified root node of one of the questions up to the predetermined depth are in less than the threshold number of words of descendent nodes of the respective root nodes of the associated answers up to the predetermined depth;
    identifying, by the controller, the word as a stop word in response to determining that the word is in less than the threshold number of the associated answers; and
    disregarding, by the QA system, the word identified as the stop word prior to generating a response to a question including the word and having a similar subject as the one of the questions.

2. The computer-implemented method of claim 1, wherein the determining that the word is in less than the threshold number of the associated answers includes determining that the word is in less than the threshold number of the associated answers near the respective root nodes of the associated answers.

3. The computer-implemented method of claim 2, wherein the identifying the word as the stop word is in response to determining that the word is in less than the threshold number of the associated answers near the respective root nodes.

4. The computer-implemented method of claim 1, wherein comparing the word near the identified root node of one of the questions includes comparing the word at the identified root node of one of the questions to words at the respective root nodes of the associated answers, and wherein determining that the word is in less than the threshold number of the associated answers includes determining that the word is in less than the threshold number of the associated answers at the respective root nodes of the associated answers.

5. The computer-implemented method of claim 1, wherein determining that the word is in less than the threshold number of the associated answers includes determining that the word is in none of the associated answers.

6. The computer-implemented method of claim 1, further comprising:
    crawling through a repository of unstructured questions and unstructured answers for a subject;

correlating data of the unstructured questions with data of the unstructured answers to structure the unstructured questions and unstructured questions into the questions and answers; and compiling the questions and answers into the QA corpus.

7. A system comprising:

a processor, and a memory in communication with the processor, the memory containing instructions that, when executed by the processor, cause the processor to:

train, by a controller associated with a Question Answering (QA) system, a machine learning model on a dataset, wherein the machine learning model is configured to output a predetermined depth and a threshold number of associated answers for identifying stop words;

iteratively update, by the controller and using the machine learning model, the predetermined depth and the threshold number of associated answers for identifying the stop words;

generate, by the controller, dependency trees for questions and answers of a question answering (QA) corpus in which the answers are associated with the questions, wherein generating the dependency trees includes identifying root nodes;

compare, by the controller, a word near an identified root node of one of the questions to words of answers associated with the one of the questions by comparing words of descendant nodes of the identified root node of one of the questions up to the predetermined depth to corresponding words of descendent nodes of respective root nodes of the associated answers up to the predetermined depth;

determine, by the controller, that the word is in less than the threshold number of the associated answers by determining that the words of the descendent nodes of the identified root node of one of the questions up to the predetermined depth are in less than the threshold number of words of descendent nodes of the respective root nodes of the associated answers up to the predetermined depth;

identify, by the controller, the word as a stop word in response to determining that the word is in less than the threshold number of the associated answers; and disregard, by the QA system, the word identified as the stop word prior to generating a response to a question including the word and having a similar subject as the one of the questions.

8. The system of claim 7, wherein the determining that the word is in less than the threshold number of the associated answers includes determining that the word is in less than the threshold number of the associated answers near the respective root nodes of the associated answers.

9. The system of claim 8, wherein the identifying the word as the stop word is in response to determining that the word is in less than the threshold number of the associated answers near the respective root nodes.

10. The system of claim 7, wherein comparing the word near the identified root node of one of the questions includes comparing the word at the identified root node of one of the questions to words at the respective root nodes of the associated answers, and wherein determining that the word is in less than the threshold number of the associated answers includes determining that the word is in less than the threshold number of the associated answers at the respective root nodes of the associated answers.

11. A computer program product, the computer program product comprising a computer readable storage medium having program instructions embodied therewith, the program instructions executable by a computer to cause the computer to:

train, by a controller associated with a Question Answering (QA) system, a machine learning model on a dataset, wherein the machine learning model is configured to output a predetermined depth and a threshold number of associated answers for identifying stop words;

iteratively update, by the controller and using the machine learning model, the predetermined depth and the threshold number of associated answers for identifying the stop words;

generate, by the controller, dependency trees for questions and answers of a question answering (QA) corpus in which the answers are associated with the questions, wherein generating the dependency trees includes identifying root nodes;

compare, by the controller, a word near an identified root node of one of the questions to words of answers associated with the one of the questions by comparing words of descendant nodes of the identified root node of one of the questions up to the predetermined depth to corresponding words of descendent nodes of respective root nodes of the associated answers up to the predetermined depth;

determine, by the controller, that the word is in less than the threshold number of the associated answers by determining that the words of the descendent nodes of the identified root node of one of the questions up to the predetermined depth are in less than the threshold number of words of descendent nodes of the respective root nodes of the associated answers up to the predetermined depth;

identify, by the controller, the word as a stop word in response to determining that the word is in less than the threshold number of the associated answers; and disregard, by the QA system, the word identified as the stop word prior to generating a response to a question including the word and having a similar subject as the one of the questions.

12. The computer program product of claim 11, wherein the determining that the word is in less than the threshold number of the associated answers includes determining that the word is in less than the threshold number of the associated answers near the respective root nodes of the associated answers.

13. The computer program product of claim 11, wherein comparing the word near the identified root node of one of the questions includes comparing the word at the identified root node of one of the questions to words at the respective root nodes of the associated answers, and wherein determining that the word is in less than the threshold number of the associated answers includes determining that the word is in less than the threshold number of the associated answers at the respective root nodes of the associated answers.

\* \* \* \* \*